(12) United States Patent
Glinowiecki et al.

(10) Patent No.: US 6,349,610 B2
(45) Date of Patent: Feb. 26, 2002

(54) STEERING COLUMN FOR A MOTOR VEHICLE

(75) Inventors: Joerg Glinowiecki, Lueneburg; Thomas Kambies, Rosengarten; Andreas Wehmeyer, Seevetal, all of (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/303,434

(22) Filed: May 3, 1999

(30) Foreign Application Priority Data

May 2, 1998 (DE) .......................... 198 19 713

(51) Int. Cl.[7] ................................ B62D 1/19
(52) U.S. Cl. ......................... 74/492; 280/777
(58) Field of Search .................... 74/493, 492; 280/777

(56) References Cited

U.S. PATENT DOCUMENTS

| | | | |
|---|---|---|---|
| 4,838,576 A | * 6/1989 | Hamasaki et al. | 280/777 |
| 5,562,307 A | * 10/1996 | Connor | 280/777 |
| 5,605,352 A | * 2/1997 | Riefe et al. | 280/777 |
| 5,609,364 A | * 3/1997 | Fouquet et al. | 280/777 |
| 5,706,704 A | * 1/1998 | Riefe et al. | 74/493 |
| 5,788,278 A | * 8/1998 | Thomas et al. | 280/777 |
| 5,961,146 A | * 8/1999 | Matsumoto et al. | 280/777 |

FOREIGN PATENT DOCUMENTS

| | | |
|---|---|---|
| DE | 1630882 | 2/1972 |
| DE | 2821707 A1 | 11/1978 |
| DE | 19542491 C1 | 2/1997 |
| JP | 63-76578 U | * 5/1988 |

* cited by examiner

*Primary Examiner*—David A. Bucci
*Assistant Examiner*—William C Joyce
(74) *Attorney, Agent, or Firm*—Crowell & Moring LLP

(57) ABSTRACT

A steering column for a motor vehicle has a steering shaft rotatably mounted in a jacket tube. The jacket tube has at least one plastically deformable deformation element associated therewith, with energy adsorption during axial displacement of the jacket tube. The at least one deformation element is secured on at least one side to the jacket tube and abuts a deflecting structure that is permanently attached to the body, and positioned axially with respect to the deformation element in such fashion that the deformation element is deformed with the aid of the deflecting structure during an axial displacement of the jacket tube.

4 Claims, 3 Drawing Sheets

STEERING COLUMN FOR A MOTOR VEHICLE

BACKGROUND AND SUMMARY OF THE INVENTION

This application claims the priority of German application DE 198 19 713.6 filed in Germany on May 2, 1998, the disclosure of which is expressly incorporated by reference herein.

The invention relates to a steering column for a motor vehicle with a steering shaft rotatably mounted in a jacket tube, with the jacket tube having at least one deformation element associated therewith, said deformation element being plastically deformable with energy absorption during axial displacement of the jacket tube.

A steering column of the above described general type is known from German Published Unexamined Patent Application No. DE 28 21 707 A1, said column being connected with the body by a deformation element. The deformation element is in the form of a U-shaped energy-absorbing metal strip. A free end of one leg is connected with the steering column and the free end of the other leg is connected with the body. In addition, the metal strip is housed in a box in which the legs of the strip abut opposite sides of the box. When the steering column is displaced axially relative to the body, the metal strip is subjected to so-called rolling bending defined by the position of the strip in the box.

A steering column of the above described general type is also known from German Patent No. DE 195 42 491 A1, said column having an axially displaceable jacket tube supported integrally on the body by an energy-absorbing deformation member. A bent metal band is provided as the deformation member, said band being connected permanently at one end with the jacket tube and at the other end with the body. The metal band is also accommodated in a guide in which it is deformable either by linear displacement or by rolling bending.

A steering column for a motor vehicle is known from German Published Examined Application DT 16 30 882 B2, said column comprising a jacket tube for a steering shaft inserted into a sleeve-shaped receptacle integral with the vehicle. A rigid shaping tool is also mounted on the receptacle. This tool plastically deforms the jacket tube with energy absorption during axial displacement of the jacket tube relative to the receptacle. In a modified embodiment, the shaping tool is mounted on the jacket tube and upon an axial displacement of the jacket tube, deforms the receptacle on which the jacket tube is mounted, including the shaping tool.

A goal of the invention is to provide a steering column of the type recited at the outset that exhibits improved deformation behavior.

This goal is achieved according to the invention by the fact that the (at least one) deformation element is secured at least unilaterally to the jacket tube and abuts deflection structure mounted on the body, said deflection structure being positioned axially with respect to the deformation element in such fashion that the deformation element is deformed by the deflecting structure when the jacket tube is displaced axially. The deformation element together with the jacket tube is moved past the deflecting structure, resulting in a deliberate and very precisely calculable deformation of the deformation element. The arrangement of the deflecting structure integrally with the body, and hence integrally with the vehicle, also ensures a specific axial displacement of the jacket tube.

In certain preferred embodiments of the invention, the deflecting structure has at least a first rigid deflecting element and at least a second deflecting element associated therewith that fit around the at least one deformation element. As a result, the deformation element is guided and positioned exactly.

In certain preferred embodiments of the invention, the first deflecting element and/or second deflecting element are in flush contact with the deformation element. When the deformation element moves relative to the deflecting elements, frictional work can be done deliberately, absorbing additional energy.

In another embodiment of the invention, the deformation element is in the form of an elongate flat element. In this manner, the entire arrangement can be produced in a manner that saves both space and weight.

In certain preferred embodiments of the invention, the deformation element is subjected to continuous plastic deformation during an axial displacement of the jacket tube. The deformation element is deformed in a spatially limited way, with the deformation propagating like a wave through the deformation element from the standpoint of the deformation element. Since the deformation element is deformed twice at every point through which the deformation passes, firstly from a non-deformed state into a deformed state and secondly back again into the initial state, an especially high degree of deformation results and hence the arrangement has a large energy absorption capacity.

In certain preferred embodiments of the invention, the deformation element is subjected to rolling bending during axial displacement. The rolling bending constitutes a special case of plastic deformation that passes through the deformation element. The deformation element is unrolled on the relative surface and likewise continuously deformed. Rolling bending can be performed deliberately and in a manner that can be determined in advance with the aid of the deflecting structure mounted on the body.

In certain preferred embodiments of the invention, the deformation element is forcibly guided between a first deflecting element in the form of a mount that is aligned transversely to the displacement direction of the jacket tube and a second deflecting element in the form of an opposite mount. Preferably, the mount is located offset with respect to both the opposite mount and to the fastening point of a deformation element on the jacket tube, axially opposite the displacement direction of the jacket tube. In this manner, high contact forces between the deformation element and a mount can be produced by displacing the jacket tube.

In certain preferred embodiments of the invention, the deformation element is forcibly guided between a first deflecting element in the form of a mount that is made wedge-shaped in the displacement direction of the jacket 2 and the second deflection element in the form of an opposite mount. With the aid of the wedge-shaped mount, the deformation element can deflect from its initial position with plastic deformation during displacement of the jacket tube. The opposite mount then serves as an additional guide.

In certain preferred embodiments of the invention, a guide gap is formed between the mount and the opposite mount that is aligned at an angle to the displacement direction of the jacket tube. Depending on the alignment and dimensioning of the guide gap, larger or smaller frictional forces can be produced between the mount and the opposite mount on the one hand and the deformation element on the other hand.

DETAILED DESCRIPTION OF THE DRAWINGS

Figures 1, 2:
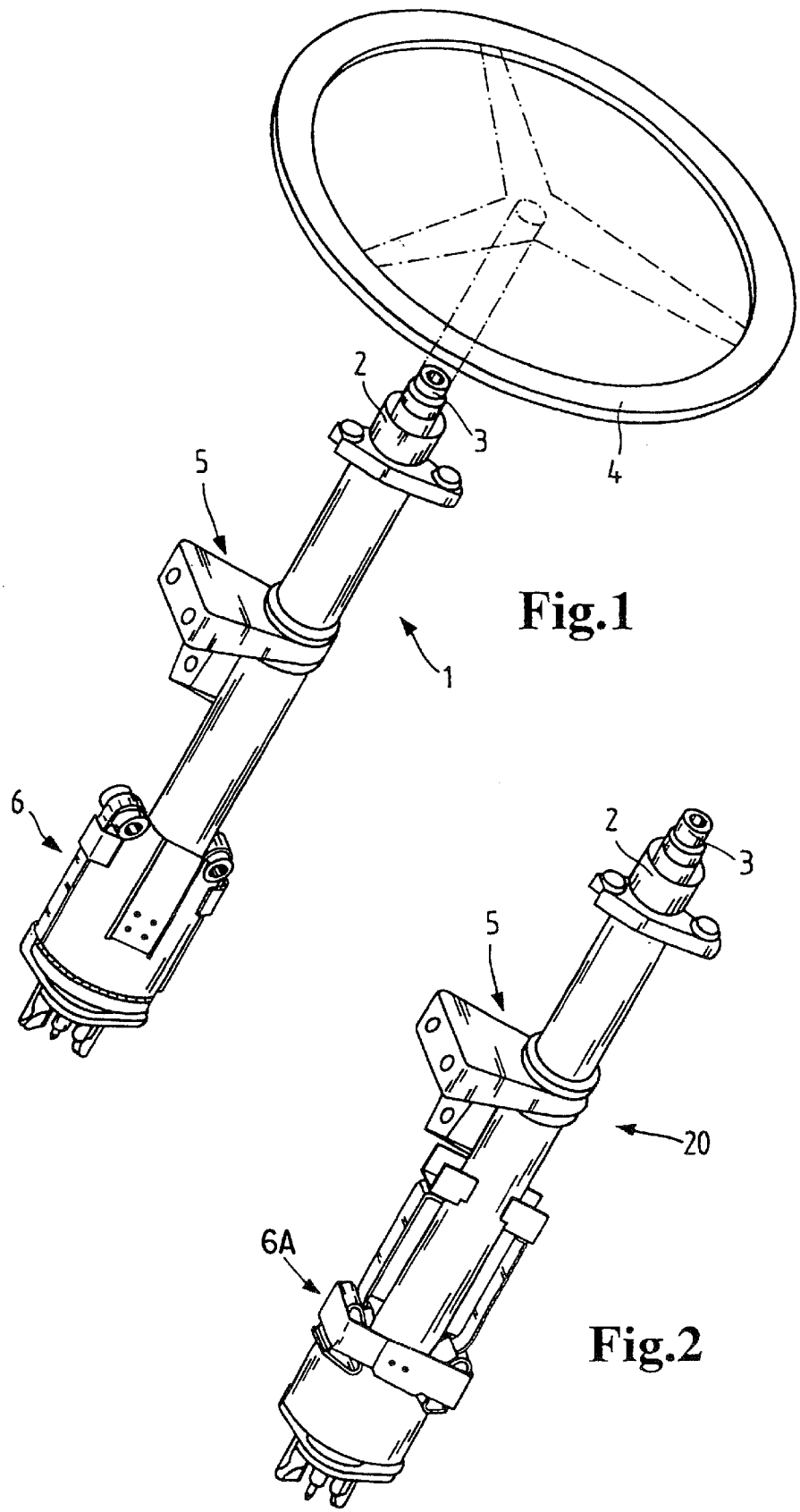
FIG. 1 is a perspective view of a steering column constructed according to a first preferred embodiment of the invention.
FIG. 2 is a perspective view of a steering column constructed according to a second preferred embodiment of the invention.
Figure 3:
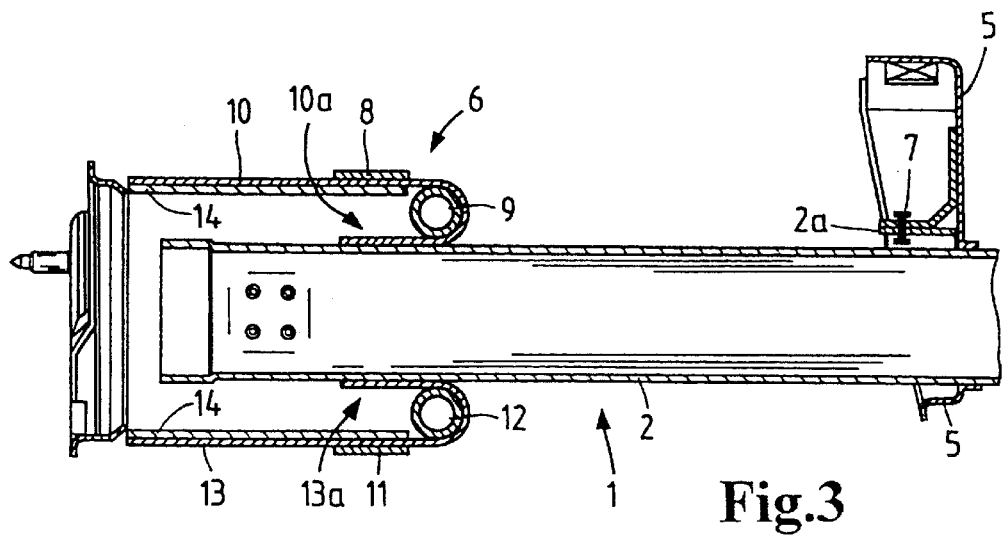
FIG. 3 is a sectional view of the steering column according to FIG. 1 with the jacket tube shown in its normal resting position.
Figure 4:
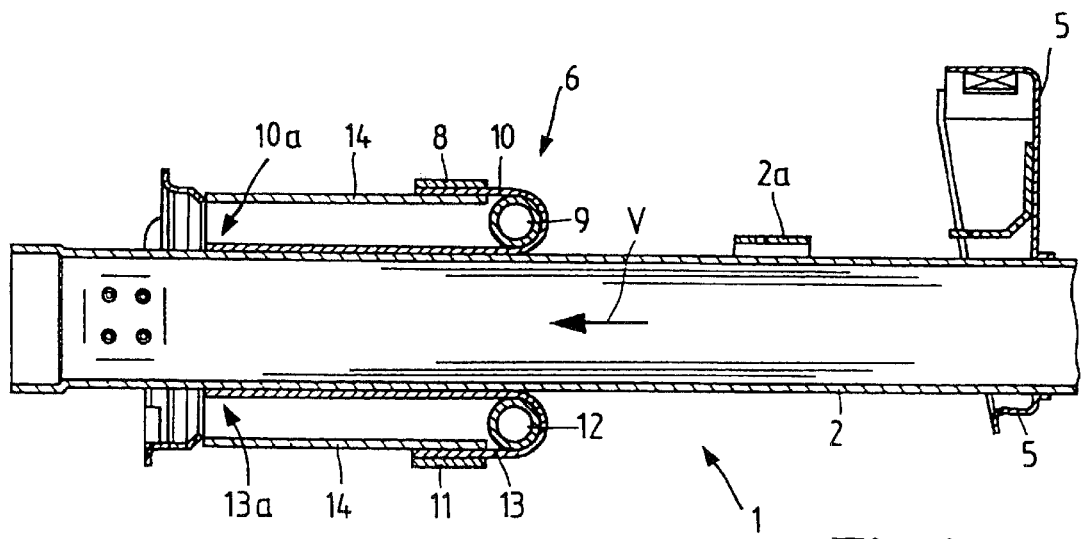
FIG. 4 is a sectional view through the steering column according to FIG. 1, with the jacket tube shown in an axially displaced position.

FIGS. 1, 3, and 4 show a first embodiment of a steering column 1 according to the invention for a motor vehicle. Steering column 1 comprises a jacket tube 2, in which a steering shaft 3 is rotatably mounted. Steering shaft 3 can be operated from a steering wheel 4 by the driver of the motor vehicle.

Jacket tube 2 is attached to the body of the motor vehicle, not shown, by an upper mount 5 and a lower mount 6. For this purpose, the upper mount 5 is attached to the jacket tube 2 by a connector 2a, with the connector 2a being secured by one or more riveted connections 7 to the upper mount 5. The lower mount 6 has deflecting structure on the body in the form of four deflecting elements 8,9 and 11,12 which are located pairwise. Deflecting elements 9 and 12 are designed as tubular sections whose axes are aligned transversely to the axis of jacket tube 2 that forms the main axis of steering column 1. Tubular sections 9, 12 each serve as mounts for associated deformation elements 10 or 13, while deflection elements 8 and 11 are made in the form of rigid sheet metal parts and serve as opposite mounts for the respective deformation elements 10 and 13.

Deformation elements 10, 13 are designed as elongate flat elements in the form of metal strips that have a rectangular or trapezoidal basic shape and are connected with jacket tube 2 in areas 10a and 13a. A deformation element according to the invention can be made from any plastically deformable material with a cross sectional area that remains constant or changes.

In the resting position of jacket tube 2 shown in FIG. 3, the fastening areas 10a, 13a as seen looking in the axial direction of jacket tube 2 are located at approximately the same height as the opposite mounts 8, 11, with the tubular mounts 9, 12 being offset relative to the displacement direction shown in FIG. 4 of jacket tube 2 (arrow V). Thus, deformation elements 10, 13, beginning at the mounting areas 10a, 13a on jacket tube 2, initially can be guided by the tubular mounts 9, 12 and then abut opposite mounts 8, 11. Mounts 9, 12 and opposite mounts 8, 11 are preferably associated with a mounting housing 14 that forms a guide gap for the associated deformation elements 10, 13 together with opposite mounts 8, 11. Deformation elements 10, 13 are therefore in flush contact with fastening housing 14, mounts 9, 12, and opposite mounts 8, 11.

In the event of a vehicle collision in which the steering wheel 4, steering shaft 3, and jacket tube 2 are subjected to an axial impact load, for example as the result of an impact between the driver of the vehicle and the steering wheel 4 (or on the other hand, of an axial displacement of the front end of the motor vehicle caused by an impact), jacket tube 2 leaves its resting position shown in FIG. 3 and moves in the direction of arrow V (or in the opposite direction) into a deflected position shown in FIG. 4. Provision is made such that riveted connection 7 shears off first, whereupon a certain resistance to tearing free is overcome that prevents inadvertent displacement of jacket tube 2. During the displacement of jacket tube 2, the deformation elements 10, 13 are moved together over the fastening areas 10a, 13a. The deformation elements 10, 13, starting at their largely stress-free positions according to FIG. 3, are pulled between deflecting elements 8, 9 and 11, 12 and are thus continuously plastically deformed. The deformation proceeds, from the standpoint of deformation element 10, 13, as a wave movement through the latter. At the same time, a larger or smaller amount of frictional work is done at the contact surfaces with the deflecting elements, depending on the surface structure. Deformation and frictional work allow efficient absorption of the movement energy introduced via the jacket tube inside the lower mount 6.

In a modified embodiment, mounts 9,12 are located so that they can rotate around their cylinder axes or are provided with especially smooth and therefore low-friction surfaces so that the deformation elements 10, 13 are subjected to so-called rolling bending, in which the deformation elements are unrolled on mounts 9,12 and on the jacket tube. This embodiment differs from the rolling bending that is known of itself by virtue of the fact that the deformation elements 10, 13 are guided deliberately and in a precisely defined manner over the deflecting elements 9,12.

The two mounts, 9 and 12, the two opposite mounts 8,11, and the two deformation elements 10, 13 are preferably each made identical and located symmetrically relative to the axis of jacket tube 2. In modified embodiments, any number of deformation elements 10 including associated deflecting elements 2,9 can be located around jacket tube 2.

Figure 5:
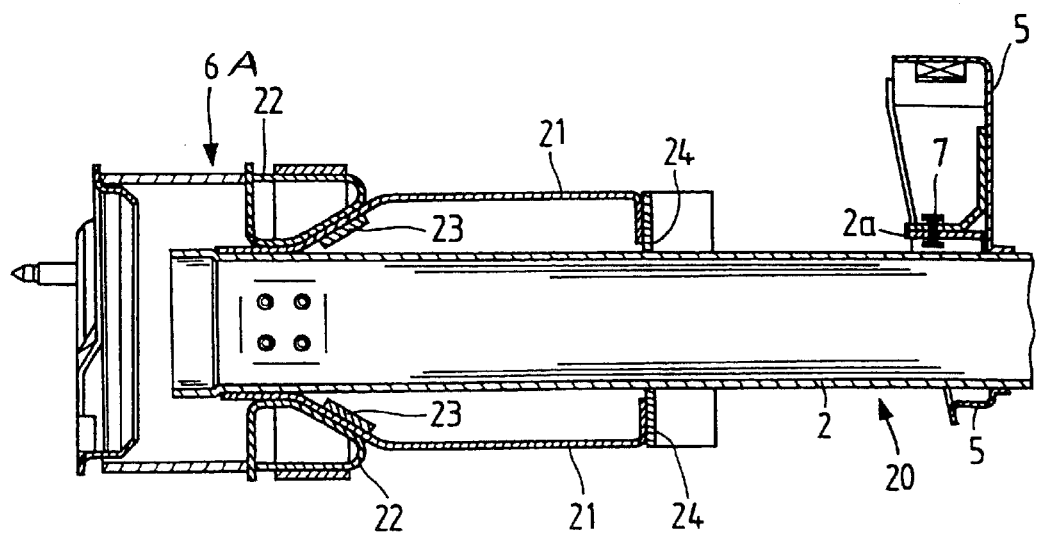
FIG. 5 shows a sectional view through the steering column in FIG. 2, with the jacket tube of the steering column shown in its normal resting position.
Figure 6:
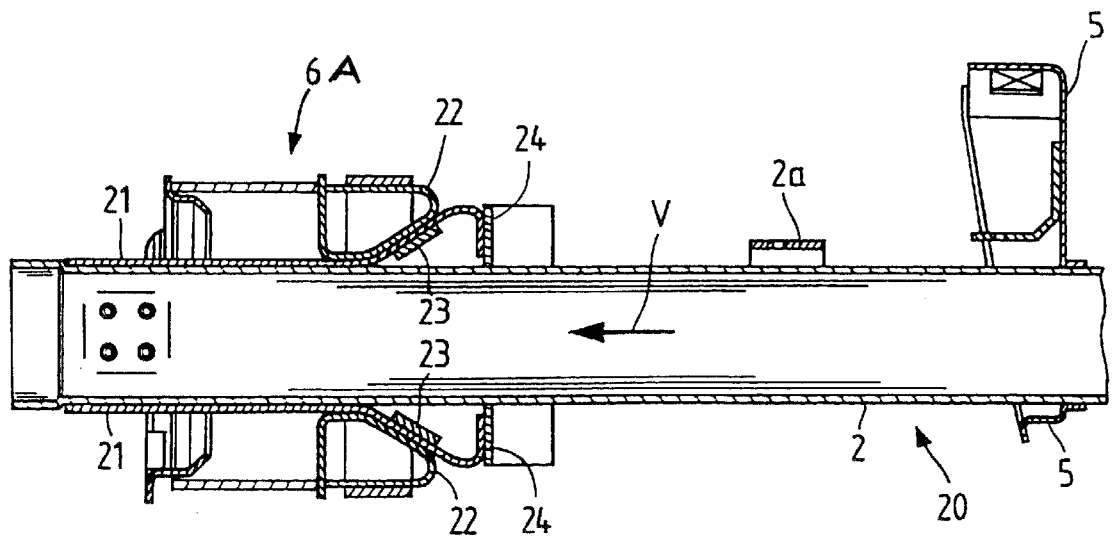
FIG. 6 is a sectional view through the steering column according to FIG. 2, with the jacket tube shown in an axially displaced position.

FIGS. 2, 5, and 6 show a steering column 20 for a motor vehicle, said column constituting another embodiment of the steering column according to the invention. Parts that are the same have been given the same reference numbers as in the first embodiment. Steering column 20, like steering column 1, has a jacket tube 2 in which a steering shaft is rotatably mounted. Jacket tube 2 in turn is mounted on the vehicle body by an upper mount 5 and a lower mount 6A, with one or more riveted connections 7 providing a supplementary shapewise mounting of jacket tube 2 by a connector to the upper mount 5.

In the vicinity of lower mount 6A, identical deformation elements 21 are each fastened by means of a mounting tab 24 opposite one another on jacket tube 2. Deformation elements 21 are each made in the form of flat elements shaped into a profile and are permanently connected at the contact points with jacket tube 2 or a mounting tab 24 attached to the jacket tube. Both deformation elements 21 have associated with them a first deflecting element in the form of a mount 22 that is made wedge-shaped in the displacement direction of the jacket tube (arrow V) and a second deflecting element in the form of an opposite mount 23. Mount 22 and opposite mount 23 are made from dimensionally stable sheet metal and fit around the associated deformation element 21, with opposite mount 23 disposed in a cavity between deformation element 21 and jacket tube 2. Between mount 22 and the corresponding opposite mount 23, a guide gap is formed that is aligned at an acute angle to the axis of jacket tube 2 or to the displacement direction of the jacket tube. Deformation elements 21 are each forcibly guided with limited play in the guide gap between mount 22 and opposite mount 23. The energy adsorption capacity of the mount can be influenced by changing the alignment of the guide gap.

In addition, guide gaps are formed between the mounts 22 and the jacket tube 2 for the associated deformation element 21.

The function of the steering column 20 according to the invention can be represented as follows. In a vehicle collision, the driver of the vehicle may impact steering wheel 4, causing the steering column 3 including jacket tube 2 to be displaced in the direction of arrow V relative to the mounts 5,6A integral with the body. During such an axial displacement of jacket tube 2, the deformation elements 21 connected therewith are pressed against the wedge-shaped holder 22, guided to the respectively associated guide gap between mount 22 and opposite mount 23, and pushed against mounts 22, 23. The deformation elements are supported by retaining tabs 24 and are subjected to continuous plastic deformation by which they are pressed successively in a radial direction against jacket tube 2. In this manner, the motion energy of the jacket tube is converted into deformation work at the deformation elements, and, depending on the surface shape, more or less frictional work is done in the guide gaps between mounts 22 on the one hand and opposite mounts 23 or the jacket tube 2 on the other hand.

In the embodiment of FIGS. 2, 5 and 6, the deformation elements 21 are made as elongate flat elements in the form of rectangular metal strips shaped to form a tub-shaped profile.

Of course, a steering column according to the invention can also be mounted on a motor vehicle body by a plurality of mounts 6, 6A offset axially with respect to one another, with a mount 6, 6A consisting of one or more structural units arranged around jacket tube 2, said units consisting of at least one deformation element 10, 13, 21, a mount 9,12, 22, and an opposite mount 8,11, 23. The shape of the deformation elements can differ from one mount to the next or from one deformation element to the next.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Steering column for a motor vehicle comprising:
   a steering shaft rotatably mounted in a jacket tube comprising a deformation element associated with the jacket tube;
   wherein the deformation element is secured at least unilaterally on the jacket tube and abuts a deflecting structure mountable permanently on a vehicle body, said deflecting structure being positioned axially with respect to the deformation element in such fashion that the deformation element is deformed with the aid of the deflecting structure during an axial displacement of the jacket tube such that energy is absorbed by the deformation element;
   wherein the deflecting structure includes first and second deflecting elements; and
   wherein the deformation element is forcibly guidable toward the jacket tube between the first deflecting element in the form of a mount that is wedge-shaped in the displacement direction of the jacket tube and the second deflecting element which is in the form of an opposite mount during a collision.

2. Steering column according to claim 1, wherein a guide gap aligned at an angle to the displacement direction of the jacket tube is formed between the mount and the opposite mount, through which gap the deformation element is guided.

3. Steering column according to claim 1, wherein the deformation element is designed as a flat element shaped into a profile, said flat element delimiting a hollow space together with the jacket tube, said opposite mount being disposed in the hollow space.

4. Steering column for a motor vehicle comprising:
   a steering shaft rotatably mounted in a jacket tube comprising a deformation element associated with the jacket tube;
   wherein the deformation element is secured at least unilaterally on the jacket tube and abuts a deflecting structure mountable permanently on a vehicle body, said deflecting structure being positioned axially with respect to the deformation element in such fashion that the deformation element is deformed with the aid of the deflecting structure during an axial displacement of the jacket tube such that energy is absorbed by the deformation element;
   wherein the deflecting structure includes first and second deflecting elements;
   wherein the deformation element is forcibly guided between the first deflecting element in the form of a mount that is wedge-shaped in the displacement direction of the jacket tube and the second deflecting element is in the form of an opposite mount; and
   wherein the deformation element is designed as a flat element shaped into a profile, said flat element delimiting a hollow space together with the jacket tube, said opposite mount being disposed in the hollow space.

* * * * *